United States Patent
Prunier

(10) Patent No.: US 6,408,077 B1
(45) Date of Patent: Jun. 18, 2002

(54) DESCRAMBLING DEVICE OF A SECURITY ELEMENT AND SECURITY ELEMENT COMPRISING SUCH A DEVICE

(75) Inventor: Jacques Prunier, Sassenage (FR)

(73) Assignee: Thomson Licensing SA., Boulogne Cedex (FR)

( * ) Notice: Subject to any disclaimer, the term of this patent is extended or adjusted under 35 U.S.C. 154(b) by 0 days.

(21) Appl. No.: 09/018,206

(22) Filed: Feb. 3, 1998

(30) Foreign Application Priority Data

Feb. 5, 1997 (FR) .............................................. 97 01306

(51) Int. Cl.⁷ .............................. H04L 9/00; H04N 7/167
(52) U.S. Cl. ...................... 380/216; 380/215; 380/261; 380/227; 380/1; 713/200
(58) Field of Search ............................ 380/1, 227, 215, 380/216; 713/200

(56) References Cited

U.S. PATENT DOCUMENTS 4,139,839 A * 2/1979 Engel et al. ................. 340/347

FOREIGN PATENT DOCUMENTS

| GB | 2257557 A | 1/1993 | ............ H04N/5/76 |
| WO | WO96/06504 | 2/1996 | .......... H04N/7/167 |

\* cited by examiner

*Primary Examiner*—Gilberto Barron, Jr.
*Assistant Examiner*—Todd Jack
(74) *Attorney, Agent, or Firm*—J. S. Tripoli; R. D. Shedd; D. T. Shoneman

(57) ABSTRACT

In a device for descrambling scrambled digital data, the digital data are grouped into parallel combinations of bits before being descrambled. The combinations of bits are descrambled and then split back into a serial stream of bits.

9 Claims, 2 Drawing Sheets

DESCRAMBLING DEVICE OF A SECURITY ELEMENT AND SECURITY ELEMENT COMPRISING SUCH A DEVICE

BACKGROUND OF THE INVENTION

1. Field of the invention

The invention relates to a security element allowing the processing of a digital data stream.

More particularly, the invention relates to a descrambling device contained in a security element such as that mentioned above.

The security element according to the invention can, for example, be a smart card of a conditional access system and the digital data can be video data.

2. Description of the Related Art

As is known to a person skilled in the art, a conditional access system enables a service provider to supply his services only to those users who have acquired entitlements to these services. Such is the case, for example, in pay television systems.

The item supplied by the service provider is an item scrambled by control words. The scrambled item can only be descrambled, and hence read by the user, in line with the entitlements allocated to this user. So as to afford access to his service only to those users who are authorized, the service provider supplies them with a smart card and a decoder.

The circuits for descrambling the item are contained either in the smart card or in the decoder.

The present invention relates equally well to the case in which the circuits for descrambling the item are in the smart card and the case in which the circuits for descrambling the item are in the decoder.

Generally, the digital data to be descrambled are transmitted to the descrambling device in the form of data packets made up of bits in series.

By way of example, in the case of a smart card according to the NRSS standard (standing for "National Renewable Security Standard"), the data packets are made up of video data of 188 or 131 bytes of 8 bits and the bit frequency of the video data is a frequency of high value, for example equal to 50 MHz. As is known to a person skilled in the art, the data packets may follow one another with no discontinuity or be separated by any number of bit periods.

Before being descrambled, the serial video data are grouped as binary combinations of 64 bits.

On account of the time taken by the operation for descrambling the 64-bit combinations, the data to be descrambled transmitted to the smart card are stored in a shift register so long as the descrambling of the current data is still in progress.

According to the prior art, the working frequency of the logic circuits which make it possible to construct the binary combinations to be descrambled is the bit frequency.

The abovementioned logic circuits are circuits built using CMOS technology ("Complementary Metal Oxide Semiconductor"). As is known to a person skilled in the art, the power consumed by CMOS technology circuits is proportional to their working frequency. Typically, for a smart card which complies with the NRSS standard, the power dissipated by the logic circuits which control the entire descrambling operation is of the order of 400 mW.

This value of the power consumed is high and has numerous drawbacks. It gives rise to mediocre reliability of the descrambling device and limits the range of temperatures in which the security element can be used.

SUMMARY OF THE INVENTION

An object of the invention is to provide a descrambling device for a security element which does not have the abovementioned drawbacks.

To this end, the invention relates to a device for descrambling digital data comprising, in series, an input circuit making it possible to form combinations of serial digital data which it receives in time with a clock signal CLK, a descrambling circuit making it possible to descramble the combinations of data arising from the input circuit and an output circuit making it possible to transform into serial digital data, in time with the clock signal CLK, the descrambled combinations of data arising from the descrambling circuit. According to the invention the input circuit comprises first means making it possible for the combinations of data to be constructed in time with a clock signal CL1 whose frequency is equal to a fraction of the timing of the clock signal CLK, the output circuit comprises second means making it possible for the descrambled combinations of data arising from the descrambling circuit to be split up into sub-combinations of data in time with a clock signal CL2 with the same frequency as the signal CL1 and the descrambling device comprises a synchronization and control device which generates the clock signals CL1 and CL2.

By virtue of the invention, the number and surface area of the circuits of the descrambling device working at the bit frequency are thus reduced.

An advantage of the invention is to decrease the power dissipated by the descrambling device.

According to a particular embodiment, the input circuit comprises, in series, a deserializer making it possible to transform the said serial digital data into combinations of n bits and the said first means making it possible to associate the combinations of n bits as blocks of combinations of m×n bits constituting the said combinations of data, and the output circuit comprises, in series, the said second means making it possible to split up the said descrambled combinations of data into m sub-combinations of n bits and a serializer making it possible to recover the descrambled data of each sub-combination of n bits.

According to a preferred aspect of the invention, the said first means comprise a first FIFO-type memory with clock signal CL1 and the said second means comprise a second FIFO-type memory with clock signal CL2.

According to a particular embodiment, the device of the invention comprises means such that the descrambling circuit possesses a transparent mode for which the data combinations which it receives are not descrambled.

According to a particular embodiment, the digital data received as input are grouped into successive data packets and the frequency of the clock signals CL1 and CL2 is equal to the frequency of the clock signal CLK divided by n and the clock signal CL2 is shifted in phase with respect to the signal CL1 in such a way as to take into account the number of bit periods which separate two successive data packets.

The invention also relates to a security element comprising a device for descrambling digital data, such as described above.

According to an aspect of the invention, the said security element is a smart card of a conditional access system.

The invention also relates to a digital decoder comprising a device for descrambling digital data, such as described above.

In the remainder of the description, the digital data taken by way of example are video data. However, more generally, the invention relates to any type of digital data, as was mentioned earlier.

Other characteristics and advantages of the invention will emerge on reading a preferred embodiment given with reference to the appended figures in which:

BRIEF DESCRIPTION OF THE DRAWINGS

In all the figures, the same labels denote the same elements.

DESCRIPTION OF THE PREFERRED EMBODIMENT

Figure 1:
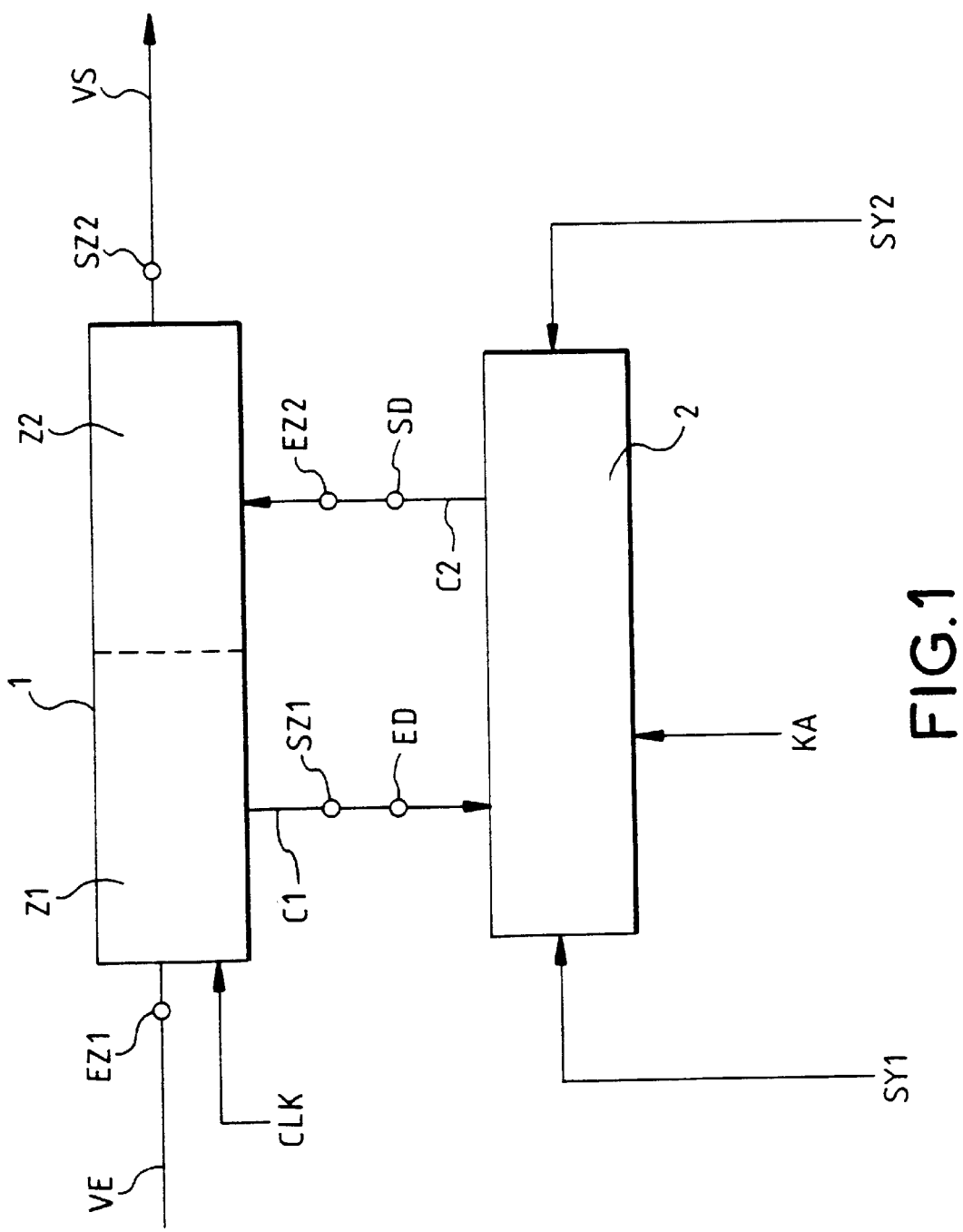
FIG. 1 represents a descrambling device of a security element according to the prior art.

The device of FIG. 1 comprises a shift register 1 divided into two zones Z1 and Z2 and a descrambling circuit 2.

The zone Z1 comprises an input EZ1 and an output SZ1 and the zone Z2 an input EZ2 and an output SZ2. The descrambling circuit 2 comprises an input ED and an output SD. The output SZ1 is linked to the input ED and the output SD is linked to the input EZ2.

A signal VE made up of video data to be descrambled is applied to the input EZ1. As was mentioned previously, the signal VE is made up of a string of digital data packets or bits in series. A clock CLK times the frequency at which the bits accumulate in zone Z1. When a collection of N bits, N possibly being, for example, equal to 64, has congregated in zone Z1, it is transferred in the form of a combination C1 of N parallel bits to the descrambling circuit 2 via the link established between the output SZ1 and the input ED. The transfer of C1 is performed under the action of the synchronization signal SY1.

Depending on the entitlements acquired by the user, descrambling may or may not be authorized. Authorization or non-authorization of the descrambling is given via a command KA applied to the descrambler circuit 2. If the descrambling operation is authorized, the descrambler 2 carries out the operation of descrambling the combination C1.

Once descrambled, the video data constitute a combination C2 of N parallel bits which is transferred from the descrambler 2 to the zone Z2 of the register 1. The transfer of the combination C2 is performed by the link established between the output SD and the input EZ2 under the action of a synchronization signal SY2.

The descrambled data contained in zone Z2 are dumped by the output SZ2 in time with the clock signal CLK so as to form the output signal VS.

In the case in which the video data which make up the signal VE are not scrambled data, they are transferred directly, through the shift register 1, between the input EZ1 and the output SZ2.

According to the NRSS standard, for example, the combinations C1 and C2 are composed of 64 bits each and the working frequency of the logic circuits which control the transfer of these combinations is equal, for example, to 50 MHz.

As mentioned previously, the power consumed by the logic circuits operating under the NRSS standard is typically of the order of 400 mW, this having numerous drawbacks.

Figure 2:
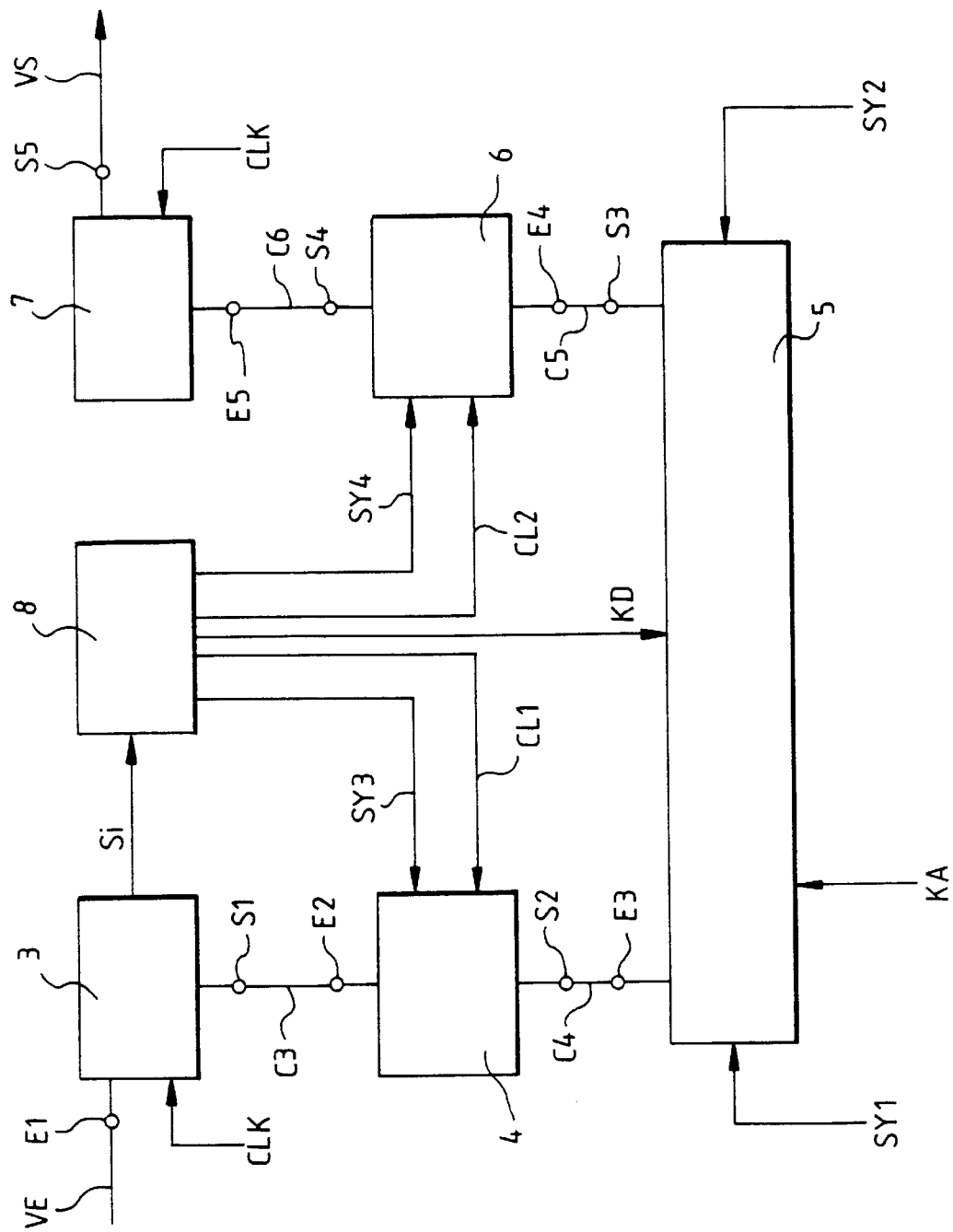
FIG. 2 represents a descrambling device of a security element according to the invention.

FIG. 2 represents a descrambling device of a security element according to the preferred embodiment of the invention.

The input circuit consists of a deserializer 3 having an input E1 and an output S1 and of a first FIFO-type memory 4 having an input E2 and an output S2.

The output circuit consists of a second FIFO-type memory 6 having an input E4 and an output S4 and of a serializer 7 having an input E5 and an output S5.

The descrambling circuit 5 has an input E3 and an output S3.

The output S1 is linked to the input E2, the output S2 is linked to the input E3, the output S3 is linked to the input E4 and the output S4 is linked to the input E5.

The signal VE made up of the video data to be descrambled is applied to the input E1 of the deserializer.

As before, the signal VE is made up of a string of packets of bits in series. A clock CLK times the frequency at which the bits accumulate in the deserializer 3.

When a first collection of n bits has congregated in the deserializer 3, the deserializer generates a synchronization signal Si enabling the synchronization and control device 8 to be initialized.

According to the invention, n is an integer less than N and greater than 1. Preferably n=8.

Each collection of n bits congregated in the deserializer 3 constitutes a combination C3 of n parallel bits. Under the action of a synchronization signal SY3 output by the device 8 and applied to the memory 4, each combination C3 is transferred from the deserializer 3 to the first stage of the FIFO-type memory 4. A clock signal CL1 output by the device 8 and applied to the memory 4 makes it possible to shift the various combinations C3 from stage to stage inside the memory 4. Preferably, the dimension of each stage of the FIFO-type memory 4 is equal to n bits.

According to the invention, the loading of the various stages of the memory 4 allows the formation of collections of m×n serial bits, m being an integer preferably equal to 8. When a collection of m×n serial bits has congregated in the memory 4, it is transferred in the form of a combination C4 of m×n parallel bits to the descrambler 5. The transfer of the combinations C4 is performed under the action of a synchronization signal SY1 applied to the descrambling circuit 5.

The frequency of the clock signal CL1 is a fraction of the frequency of the clock signal CLK. Whereas the frequency of the clock signal CLK is, for example, equal to 50 MHz, the frequency of the clock CL1 is equal to 50/n MHz, i.e. 6.25 MHz in the case where n=8.

Generally, a combination C4 of m×n parallel bits may be composed of scrambled data or of nonscrambled data.

According to the invention, the descrambler 5 can operate not only according to a descrambling mode but also according to a transparent mode. The term transparent mode is understood to mean a mode of transfer of non-scrambled data in which the descrambling operation is not carried out.

A command signal KD output by the device 8 and applied to the descrambler 5 enables the descrambler to be placed either in descrambling mode or in transparent mode depending on whether the data transferred into the descrambler 5 are scrambled data or non-scrambled data.

In the case in which the data are scrambled, the descrambler circuit 5 carries out the descrambling operation provided that authorization therefor is given via the command KA. The descrambled data then constitute a combination C5 of m×n parallel bits which is transferred from the descrambler 5 to the second memory 6. The transfer of the combination C5 is carried out under the action of the synchronization signal SY2 applied to the descrambling circuit 5 or to the memory 6.

A clock signal CL2 and a synchronization signal SY4 which are output by the device 8 are applied to the second FIFO-type memory 6. The signals CL2 and SY4 play a role symmetric to that of the signals CL1 and SY3 applied to the first FIFO-type memory 4.

The clock signal CL2 is a signal with the same frequency as the clock signal CL1 and its phase shift with respect to the signal CL1 is adjusted so as to take into account the number of bit periods which separate two successive data packets.

Under the action of the clock signal CL2 the memory 6 makes it possible to transform each combination C5 of m×n bits into a succession of m sub-combinations C6 of n bits each.

The combinations C6 output by the memory 6 are transferred into a serializer 7. Under the action of the clock signal CLK, identical to the signal applied to the deserializer 3, the binary data emanating from the serializer 7 then constitute a descrambled data signal VS.

According to the embodiment described above, the synchronization signals SY2 and SY4 are applied to the descrambling circuit 5 and to the memory 6 respectively. The invention also relates to other embodiments in which the synchronization signal SY2 is applied to the memory 6 and the synchronization signal SY4 is applied to the serializer 7.

Moreover, according to the preferred embodiment described above, the input circuit consists of, in series, a deserializer and a first FIFO-type memory and the output circuit consists, in series, of a second FIFO-type memory and a serializer.

By virtue of the invention, only the deserializer 3 and the serializer 7 work at the bit frequency, the whole of the remainder of the descrambling device working at a lower frequency. Thus, the power dissipated by the descrambling device of the invention is markedly lower than that of the prior-art devices.

More generally, the invention relates to any type of input circuit comprising means whereby the binary combinations to be descrambled can be constructed in time with a clock signal CL1 whose frequency is equal to a fraction of the frequency of the clock signal CLK which defines the bit frequency as well as to any type of output circuit comprising means whereby the descrambled binary combinations output by the descrambling circuit can be divided up into binary sub-combinations in time with a clock signal CL2.

What is claimed is:

1. A device for descrambling digital data to be received at the bit frequency of a clock signal CLK comprising:
   an input circuit, operating at the frequency of said clock signal CLK, for forming serial combinations of n bits of said digital data;
   means for associating said combinations of n bits as blocks of m combinations, said associating means receiving a clock signal CL1 having a frequency less than that of said clock signal CLK; and
   a descrambling circuit for descrambling said blocks.

2. The device according to claim 1, further comprising:
   an output circuit for transforming into serial digital data, at the bit frequency of the clock signal CLK, the descrambled blocks of data arising from said descrambling circuit, said output circuit comprising:
      means for splitting up said descrambled blocks of data arising from the descrambling circuit into sub-combinations of data in time with a clock signal CL2 with the same frequency as the signal CL1; and
      a serializer for recovering said descrambled data of each sub-combination of data.

3. The device according to claim 2, wherein said means for splitting up said descrambled combinations of data comprise a second FIFO-type memory with clock signal CL2.

4. Device according to claim 1, wherein said first means for associating said combinations, of data comprise a fist FIFO-type memory.

5. Device according to claim 1, further comprising means such that the descrambling circuit possesses a transparent mode for which said data blocks which it receives are not descrambled.

6. Device according to claim 2 in which the digital data received as input are grouped into successive data packets, wherein the frequency of the clock signals CL1 and CL2 is equal to the frequency of the clock signal CLK divided by n and wherein the clock signal CL2 is shifted in phase with respect to the signal CL1 in such a way as to take into account the number of bit periods which separate two successive data packets.

7. Device according to claim 2, further comprising a synchronization and control device which generates the clock signals CL1 and CL2.

8. A method for descrambling scrambled digital data comprising:
   receiving said scrambled digital data at a first frequency;
   forming serial combinations of said received digital data at said first frequency;
   forming blocks comprising at least two of said serial combinations at a second frequency;
   descrambling said blocks of data;
   transforming said descrambled blocks into descrambled combinations of serial digital data at said second frequency; and
   providing said descrambled serial digital data as a descrambled digital data signal at said first frequency.

9. A device for descrambling digital data to be received at the bit frequency of a clock signal CLK comprising:
   an input circuit, operating at the frequency of said clock signal CLK, for forming serial combinations of n bits of said digital data;
   means for associating said combinations of n bits as blocks of m combinations, said associating means receiving a clock signal CL1 having a frequency less than that of said clock signal CLK;
   a descrambling circuit for descrambling said blocks; and
   means for operating said descrambling circuit in a transplant mode for which said data blocks which it receives are not descrambled.

* * * * *